Nov. 17, 1964    R. D. GOROZPE    3,157,514
METHOD FOR PREPARING QUICK-COOKING RICE
Filed Dec. 20, 1961    4 Sheets-Sheet 1
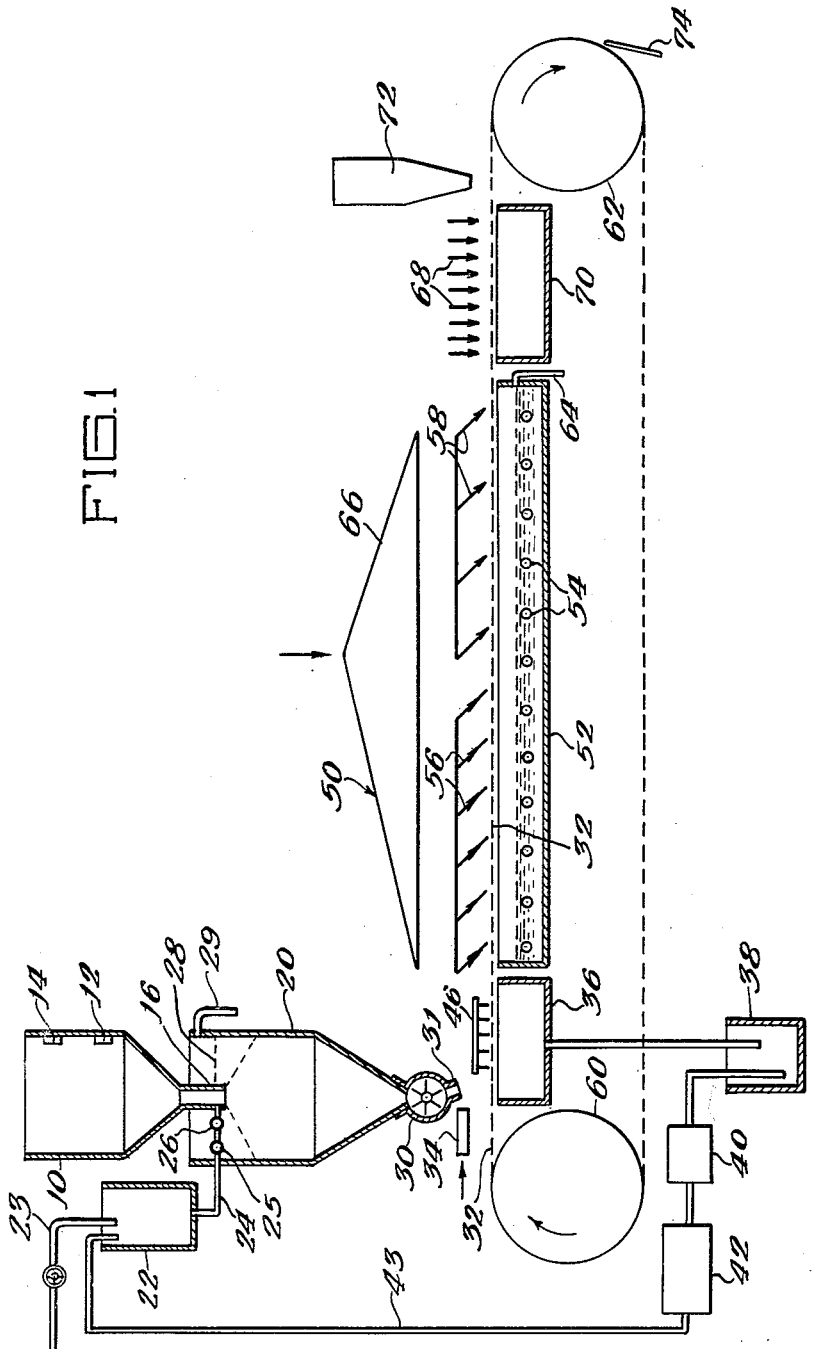
Inventor:
Raul Donde Gorozpe

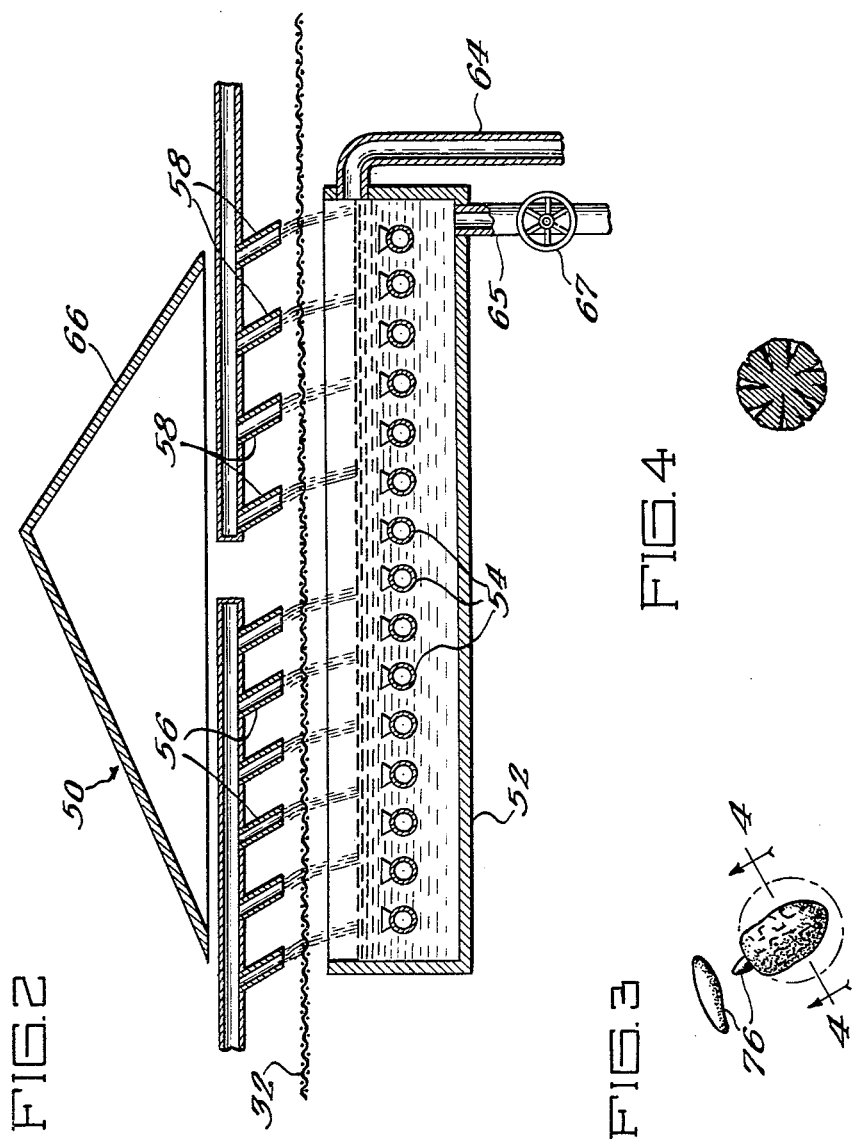

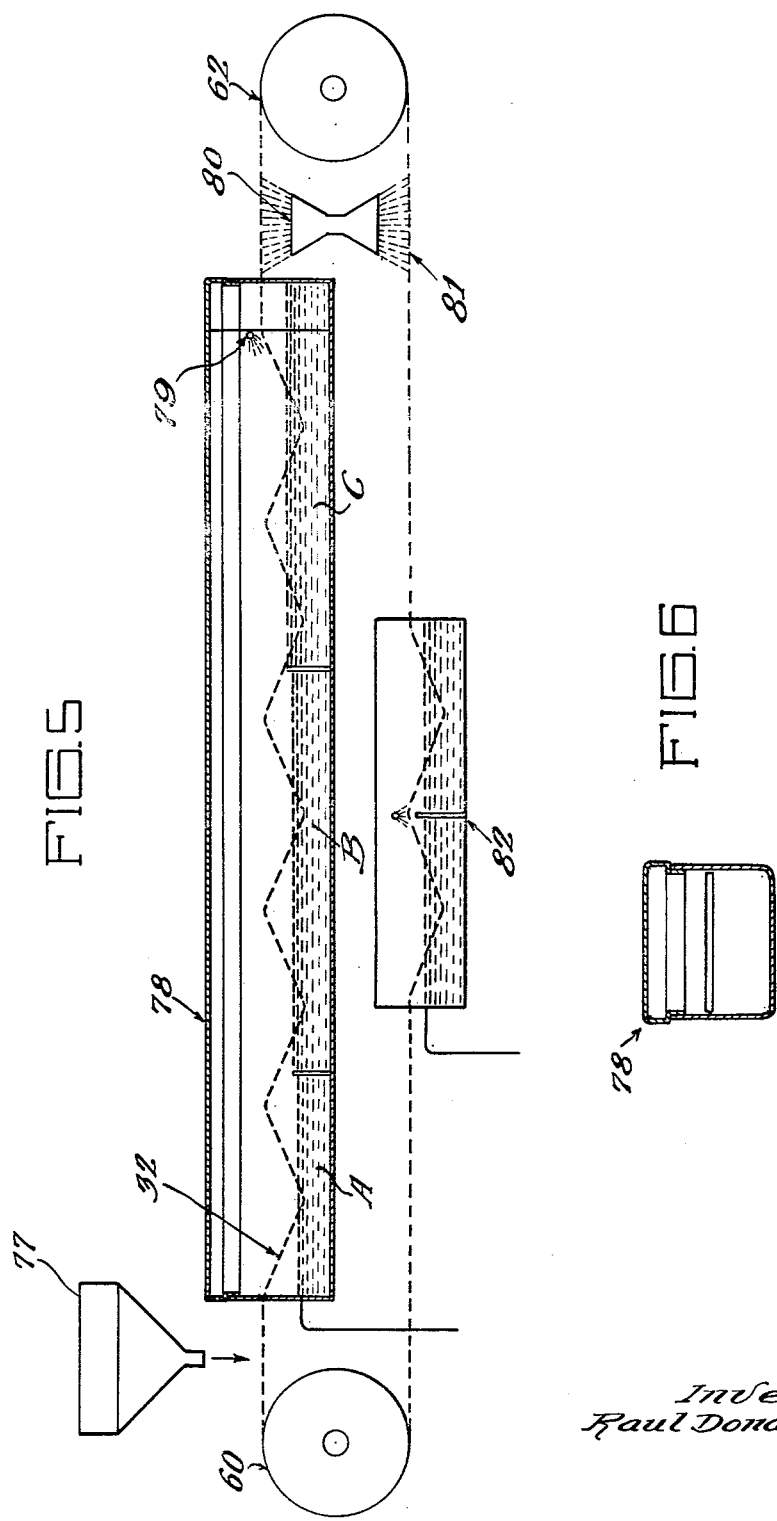

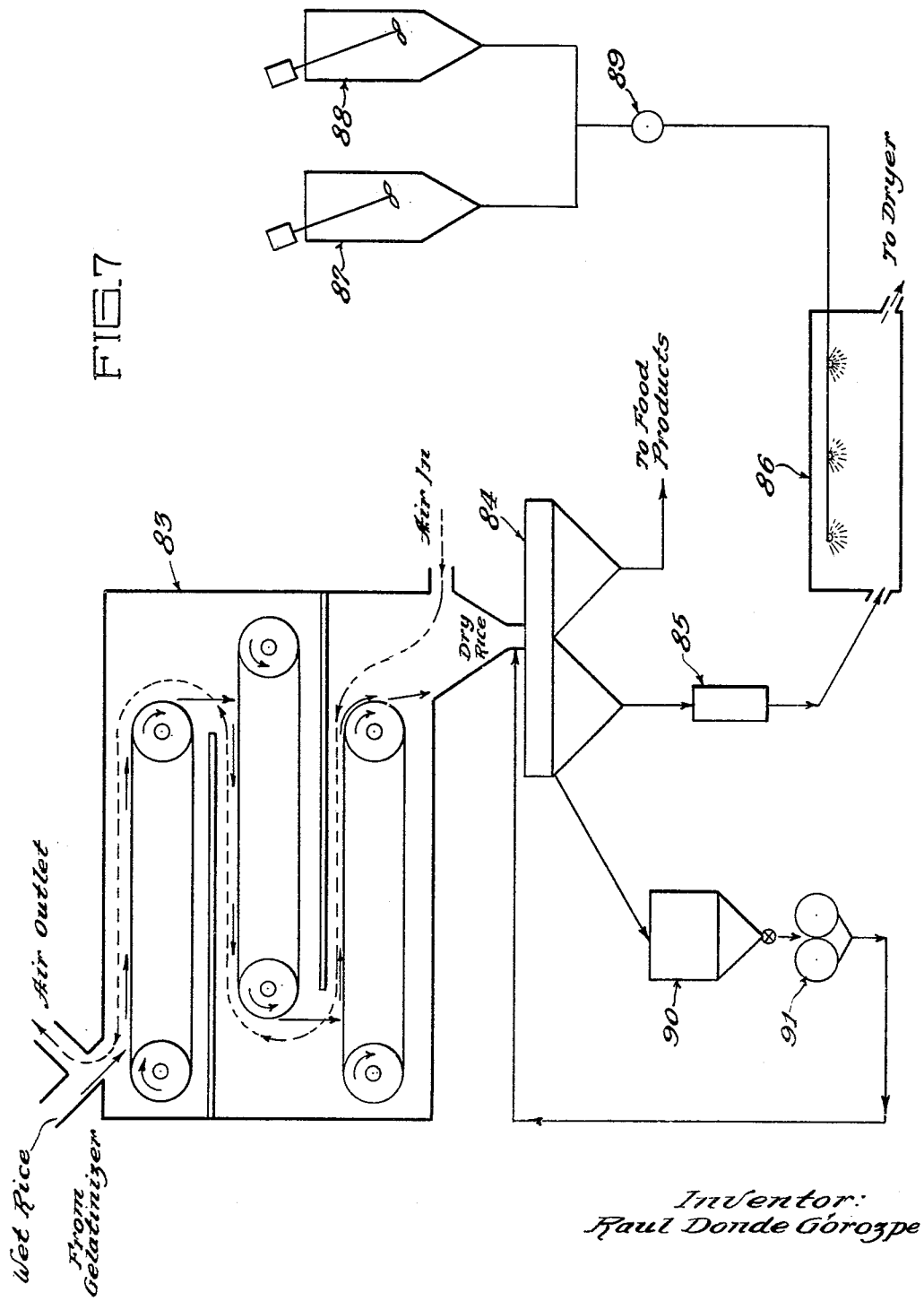

United States Patent Office

3,157,514
Patented Nov. 17, 1964

3,157,514
METHOD FOR PREPARING QUICK-
COOKING RICE
Raul Donde Gorozpe, Mexico City, Mexico, assignor to
Corn Products Company, New York, N.Y., a corporation of Delaware
Filed Dec. 29, 1961, Ser. No. 161,777
8 Claims. (Cl. 99—80)

This invention relates to a method of and an apparatus for preparing a quick-cooking rice product.

There are precooked rice products on the market identified as "quick-cooking rice"; but some, although good products from the standpoint of quick-cooking, are very expensive, costing as much as three times the price of ordinary rice. Others, that are not as quick-cooking and are less expensive, nevertheless, cost twice as much as ordinary rice.

The high prices demanded for the quick-cooking rice products on the market are generally due to the methods of manufacture that are employed, which methods are inefficient and cause loss of material during the process. Further, these methods involve the loss of nutritive values of the rice and require extra large amounts of enrichment materials to restore the original nutritive values thereby increasing the cost of the product.

An object of the invention is to provide a process for preparing a quick-cooking rice product which reduces the amount of enrichment materials needed to be added to the grain during the processing over that normally used in known processes for preparing such products.

Another object of the invention is to provide apparatus for preparation of quick-cooking rice product which will quickly and uniformly gelatinize the rice grain, yielding an improved product in a shorter time, and with resultant lowered cost of manufacture.

Still another object of the invention is to provide an improved method and apparatus for imparting diversified flavors and nutritional supplements while the rice grain is being hydrated, and again at a later stage in the process of preparing the rice product.

A still further object of this invention is to provide a rice product whose porous structure enables a quick and complete penetration of the product by boiling water in the process of preparing the product for eating.

The novel features of the invention resides mainly in the method of gelatinizing the rice quickly and uniformly; the method used for imparting diversified flavors and nutritional supplements while the rice is being hydrated; the apparatus for performing the required operations; and in the final resultant product.

The present invention provides a process for preparing a quick-cooking rice product which comprises hydrating rice grains with an aqueous medium below the gelatinization temperature of the rice, i.e., about 55° C. until the rice is saturated with moisture, continuing hydration intermittently while maintaining the temperature of each layer of the rice grain above the gelatinization point until that layer of the rice grain is gelatinized, whereby overgelatinization of the portions already gelatinized is prevented.

In order to gelatinize rice, a certain amount of moisture, in addition to that present in hydrated rice, is necessary. If hydrated rice is cooked in a single operation, it is possible for the rice to absorb the necessary moisture for complete gelatinization of the entire grain. However, such products are sticky because of overgelatinization. In order to dry them successfully it is necessary to remove the sticky portions and this results in great loss of product. I have discovered that overgelatinization may be prevented by introducing additional moisture into the hydrated rice in several stages while maintaining the temperature of the rice above the gelatinization temperature. For example, the additional moisture may be added in several stages by first immersing the hydrated rice into hot or boiling water, then removing it and keeping it in an atmosphere of steam. This may be repeated several times until the rice is completely gelatinized. The gelatinization starts as soon as the rice grains have absorbed additional moisture and have attained the temperature of the hot or boiling water. During each immersion about 4 to 6 percent additional moisture is absorbed by the rice. When the rice is removed from the water and kept in a steam atmosphere, for example, on a screen or mesh wire conveyor, the temperature remains substantially the same or at least above the gelatinization point. The rice starts to swell during the first immersion and the swelling continues in the steam atmosphere. While the rice is in the steam atmosphere, the moisture absorbed penetrates the rice grain, further swelling it. This results in the disappearance of the film of free water on the outside of the rice, thereby preventing the excess water from causing overgelatinization. The loose starch remains in the cooking water thus also preventing stickiness. The immersion and removal steps are repeated until the rice grains are completely gelatinized. If the system is not entirely closed, there may be some evaporation of the free water on the outside of the grains.

Another method of introducing additional moisture into hydrated rice while it is undergoing gelatinization, as for example, in an atmosphere of steam, is to spray hot water, i.e., having a temperature above the gelatinization point of rice, intermittently on the rice. This permits the rice to absorb additional moisture necessary for gelatinization while maintaining the temperature high enough to gelatinize the rice. It is permissible to also spray cold water (10–55° C.) on the rice after the outer portions are gelatinized to prevent overgelatinization. In this event temperature of the inner portions of the rice grain remains above the gelatinization point.

In addition the invention provides a process for preparing a quick cooking rice product which comprises fissuring rice grains having a moisture content of less than about 15 percent by contact with air at a temperature in the range of 50 to 150° C. and having a moisture content not exceeding about 10 grams per kilogram of bone dry air, until the moisture content of the rice grains is reduced by 4–8 percent, hydrating the fissured rice grains at a temperature in the range of 20–55° C. to increase the moisture content to 25–40 percent, partially gelatinizing the hydrated rice over a period of 3 to 10 minutes by passing steam upward through a layer thereof and intermittently spraying water at a temperature above 55° C. on the top of the layer, continuing gelatinization for an additional period of from 3 to 10 minutes by passing steam upward through the layer of the partially gelatinized rice grains and intermittently spraying water having a temperature in the range of 10–55° C. on the top of the layer, cooling the gelatinized rice grains and drying to a final moisture content in the range of 10–14 percent.

The invention also provides apparatus for preparing a quick-cooking rice product comprising means for hydrating rice grains at a temperature below about 55° C. to increase moisture content to a level sufficient to permit subsequent gelatinization, means for partially gelatinizing the hydrated rice by treatment with water or water vapor at a temperature of at least 55° C. until at least the outer surfaces of said rice grains are gelatinized, means for continuing the gelatinization of the rice particles at a temperature of at least 55° C. while intermittently cooling the rice grains to inhibit further gelatinization of the previously gelatinized portions and gelatinizing the remaining portions of the rice grains, means for cooling the gelatinized rice grains and means for drying the cooled rice grains.

The invention further provides apparatus for preparing a quick-cooking rice product comprising a gelatinizer for quickly and uniformly gelatinizing the rice grains in two stages, comprising means for conveying said grain, means in said first stage for applying steam to the conveyed rice continuously and applying hot water sprays intermittently, and means in said second stage for applying steam continuously to the conveyed rice and cold water sprays intermittently.

The rice product prepared by the invention has quick-cooking properties and high nutritive value and can be commercially marketed at a reasonable price only slightly higher than ordinary rice, unprocessed for quick-cooking, but compensating for this small difference in price by saving the purchaser time, fuel and nutritional values.

The process of the invention for making a quick-cooking rice is simple and continuous, and may be automated so that it is economical to perform, thereby greatly reducing the manufacturing cost of the prepared rice.

In accordance with the invention, any desired additives including flavor, color, minerals and vitamins are easily incorporated in the rice thus pleasing the taste of people of different strain, regions, countries or localities. Such additives may be applied at any time during the process, i.e., at hydration, during gelatinization or after gelatinization.

By means of the present invention the rice is a uniformly gelatinized product that may be easily cooked for serving, and which with slight changes, not affecting the basic manufacturing process, plus slight differences in the instructions for cooking, will result in a product which will suit the different tastes and particular ways of cooking rice in various countries.

In one mode of practicing the invention, whole grain, brown or white milled rice is well dry cleaned and elevated into a bin which is kept filled by automatic means. The rice grain is fed to a hydrator which increases the moisture content of the rice to about 30–40 percent over a period of 120 minutes using water at ambient temperatures. Desirably, enrichment additives are included in the hydrating liquid. The hydrated rice is fed out of the hydrator and passed through a gelatinizer which quickly and uniformly gelatinize the rice in two stages, each lasting approximately 3–10 minutes. One stage utilizes wet steam continuously, and hot or warm water sprays intermittently applied to the rice. The second stage utilizes wet steam continuously and water sprays having ambient temperature intermittently applied to the rice. By this means the rice is gelatinized approximately 85 to 95 percent.

In accordance with a further embodiment of the invention the hydrated rice is gelatinized by placing a layer of rice on a reticulated belt which is passed in and out of hot or boiling water bath thus alternately exposing the rice grains to hot water and steam or air at 100 percent relative humidity. The moving layer of rice grains may then be treated as in accordance with the second stage discussed above or alternately passed through a water bath having a temperature lower than about 55° C. and into an atmosphere of steam or saturated air.

The intermittent exposure of the rice grains to heating and then cooling media or atmospheres serves to uniformly gelatinize the rice grains from their outside surfaces to their interior or centers in a balanced manner. The cooling media act to momentarily lower the temperature of the outer surfaces of the rice grains so that the inside portions and the outer surfaces are gelatinized more or less equally. After gelatinization, the rice is cooled to less than 55° C. and the moisture content is then approximately 40–65 percent. At this time, more enrichment additives may be applied if so desired. The rice is then dried in several stages by air up to 150° C. to reduce the moisture content to approximately 10–14%. The rice is now ready to be classified and packed. During the drying operation various additives, e.g., flavor, nutritional supplements, coloring materials may be added by sprays, blenders, etc. In the automatic process for producing the product, it is possible that the hydrating liquid be salvaged, and accordingly, apparatus may be provided whereby the excess hydrating liquid is decanted or drained from the rice, and run through a filter. The dry substance content thereof may then be recovered.

It is advantageous to pretreat the rice grains before hydration to create fissures in the grains. Fissuring may be accomplished by means of dry air, infrared rays, or other heating systems and in the fissuring step the moisture content is reduced by about 4–8%. The use of drying air having an absolute humidity not exceeding about 10 grams per kilogram of bone dry air for fissuring is a novel feature. The dry air may be at any temperature not exceeding about 150° C. but in practical operations a temperature range of 50–120° C. will be satisfactory. The drying air is passed over and around the rice grains.

It is recognized that prior art methods have used hot air in the fissuring of rice grains. However, it was not known or appreciated to use hot air which is substantially dry at ambient temperature. For example, in most geographical areas, air would have a high moisture content, unless previously dehydrated. Therefore the prior art processes did not attain the desirable results which I attain by using a dehydrating step where necessary before using the air for fissuring.

The combination of the fissuring step as described when used in combination with my novel method of gelatinizing the rice, produces unexpected results over prior art methods.

The resultant and novel product of my invention, is a quick-cooking rice. One method of cooking for table serving consists in adding a cup of rice to a cup and a half of boiling water and boiling the mixture on a very low fire for only one-half to four minutes. After removal from the fire and standing for ten minutes, the rice is ready to serve. Another method consists in adding an edible oil or fat or flavoring or coloring material to the water prior to boiling and then adding the rice, cooking it two to four minutes and letting it stand for 10 minutes after which the rice is ready to serve.

The invention, both as to its organization and its method of operation, together with additional objects and advantages thereof, will best be understood from the following description of specific embodiments when read in connection with the accomanying drawings, wherein like reference characters indicate like parts throughout the several figures and in which:

FIGURE 1 is a diagrammatic layout of an apparatus according to one embodiment of the invention for producing a quick-cooking rice product;

FIGURE 2 is a diagrammatic cross-sectional view of the gelatinizer shown in FIGURE 1;

FIGURE 3 is a plan view of rice kernels after undergoing the present process, a portion of one kernel being highly magnified;

FIGURE 4 is an enlarged cross-sectional view through a rice kernel and taken on line 4—4 of FIGURE 3;

FIGURE 5 is a diagrammatic layout of a portion of an apparatus according to another embodiment of this invention for producing a quick-cooking rice product;

FIGURE 6 is a cross-sectional view of the gelatinizing chamber shown in FIGURE 5; and FIGURE 7 is a diagrammatic view of a drying system used in association with the apparatus shown in FIGURE 6.

The process hereinafter described is that which has been developed with respect to certain varieties of rice.

The steps of the process preferably include fissuring of the rice particles as described above followed by hydration of the rice grains at a temperature in the range of 20–55°

C. for a period of from 30 to 120 minutes to obtain a moisture content in the range of 25–40%.

The hydrating liquid is water or an aqueous solution or mixture containing flavoring and water soluble vitamins, minerals and/or other additives which are desirably added to the product. As the grain rice has been husked or milled to remove the shell, well dry cleaned and fissured before placement in the hydrating liquid, the solution will permeate the rice grain and thus the flavor, vitamins or other additives are soaked into the rice. Vitamins in the skin layers of the rice grain also tend to be carried into the interior and absorbed by the grain during this soaking period. After hydration, the rice is drained to remove the excess liquid and desirably, such liquid is collected and pumped through a filter for re-use in the continuous process. The filter serves to separate loose starch, broken grains, extraneous matter and other impurities from the excess hydrating liquid.

The hydrated rice grains are then gelatinized in two quick stages, each lasting from 3–10 minutes. In the first stage, the rice grain is subjected, while moving on a reticulated conveyor, to wet steam from below and spaced apart hot water sprays from above. The individual sprays are so positioned as to strike the moving rice approximately every 15 seconds. In the second stage of gelatinization, the moving rice is again continuously subjected to wet steam from below, but the sprays from above are cold water sprays. These are preferably positioned apart like the hot water sprays, but more widely spaced so as to strike the rice every 30 seconds instead of every 15 seconds. Thus, in 6–20 minutes, the rice is uniformly gelatinized to approximately 85–95% of completeness.

After the second stage of gelatinization, the rice is cooled to ambient temperature and the moisture content is then approximately 45–65%. The rice may then be dried in several stages by forced air of, for example, approximately 150° C. and having, for example, a velocity up to about 300 feet per minute. The drying in the first stages lowers the moisture content to about 20–25%. At this stage, additional flavoring, coloring or enriching materials may be incorporated in the rice, e.g. by spraying, blending, etc. The rice is finally dried to a moisture content of 10–14 percent, allowed to cool and packed.

The rice product so produced has the appearance of normal rice or other marketed quick-cooking rices except that under a magnifying glass the rice kernels or grains show a number of minute, irregularly spaced, horizontal and vertical lines or cracks. The number and positioning of these hair lines permit the ready and complete penetration of cooking water and so contribute to the quick-cooking properties of the product. The grains from other marketed quick-cooking rices in distinction show horizontally spaced bands in lesser number and more evenly spaced.

Other advantages of the rice product of the present invention are its excellent keeping properties in storage because of the steam sterilization during gelatinization; its very high nutritive value and improved flavor, very little of the natural nutritive value being lost during the processing and because of the enrichment material daded; and its capability of being prepared for eating after only one-half to four minutes of boiling at low heat, the aforementioned cracks or fissures enabling rapid moisture penetration and rehydration of the entire kernel. When prepared for table use, the product is practically indistinguishable from first grade large grained, whole rice, whether unprocessed or processed for quick cooking, while the cost is only slightly more than that of ordinary rice, but considerably less than that of other quick-cooking rice.

In order to more clearly set forth the invention, several specific examples will now be described in detail with reference to the accompanying drawings.

Referring specifically to FIGURE 1:

Whole grain rice, brown or white milled, and having a moisture content of 10–14 percent is well dry cleaned by usual methods and conventional apparatus. The cleaned rice grain is preferably fissured as described above and then elevated or otherwise placed in bin 10. The bin is kept filled. Limit switches 12, 14, also of conventional design, are employed for automatically controlling the level of the grain in the bin. The bin may be provided with a hopperlike bottom and a discharge spout 16 at the lower end thereof, adjacent to the upper end of the hydrator 20. Bin 10 feeds the rice to the hydrator by gravity and the discharge spout 16 is selfclosing when the hydrator 20 is filled to the level of the bottom of spout 16.

A supply tank 22 having a water supply pipe 23 and a discharge pipe 24 serves to fill the hydrator 20 with water or a hydrating solution or mixture. The discharge pipe 24 is provided with a discharge valve 25 controlled by a float 26 which operates the valve 25 to control addition of hydrating liquid when the hydrator is filled to the level indicated at 28. Above this level is a drain pipe 29 which prevents overfilling of the hydrator in case of failure of the float 26 to operate properly. The control of the valve 25 by the float 26 thus maintains the level of the solution practically constant in the hydrator 20.

Although plain water may be used for the hydration, it is possible to use an aqueous solution or mixture containing flavoring, water soluble vitamins, minerals or other additives. This solution permeates the rice grains in the hydrator 20 and thus, the flavoring, vitamins and other additives are soaked into the rice. The strength of the solution may be varied to obtain the best results. It has been found that soaking the rice for a period of approximately 120 minutes at ambient temperature yields very satisfactory results.

At the end of the hydration period, the hydrated rice is fed out of the bottom of the hydrator 20 by means of a device e.g., metering or conveying 30 and deposited through outlet 31 on a foraminous or reticulated wire screen conveyor 32. The speed of device 30 is regulated to automatically feed the rice out at the end of the hydrating period and maintain a constant slow flow. In passing from the outlet 31, the stream of hydrated rice may be subjected to an air blast from nozzle 34 which aids in draining the excess hydrating liquid from the rice. The hydrated grains of rice are spread evenly on the conveyor in a layer about 12 mm. to 24 mm. (one-half inch to one inch) thick by means of the spreader 46 which is positioned above the conveyor adjacent the area in which the rice is deposited from the outlet 31, and this spreading action also assists in removing excess liquid.

A drain tank 36 is positioned under the hydrator outlet 31 and spreader 46 and beneath the conveyor 32 to receive the excess hydrating liquid and direct it to a sump 38. An automtically controlled pump 40 lifts the excess hydrating liquid from the sump and forces it through a filter 42 which removes loose particles of starch, broken grains, and other foreign material carried with the hydrating liquid. The filtered liquid is pumped through pipe 43 back to the supply tank 22 for re-use in the continuous process for treating the rice. Practically all of the excess solution is taken from the rice which only retains that part of the hydrating solution which has permeated into the interior of the grain.

The moving layer of rice is carried by the conveyor 32 into a gelatinizer 50, more clearly shown in FIGURE 2. The gelatinizer comprises an open topped tank 52 positioned under the conveyor screen 32 and having steam pipes 54 disposed therein for its entire area, said pipes preferably being submerged in a water bath. The steam pipes 54 are each perforated or otherwise fashioned to permit steam to escape and rise through the water bath to produce wet steam which rises through the foraminous conveyor 32 and through the layer of moving rice carried thereon. At the entrance end of the gelatinizer are positioned one or more series of hot water spray nozzles 56 disposed above the conveyor 32 and spaced at such intervals, in accordance with the speed of the conveyor, as to direct continuously water sprays downwardly upon the rice with a time interval of 15 seconds between sprays during its movement.

The nozzles 56 preferably are inclined to direct the sprays downwardly at an angle of approximately 45° and in the direction of movement of the conveyor 32. One or more series of nozzles 58 are similarly positioned over the conveyor at the exit or other end of the gelatinizer 50, and these spray cold water (10–55° C.) upon the rice. These water nozzles are fewer in number and preferably located farther apart so that the rice will be sprayed at this stage once every 30 seconds. Both water sprays are preferably very fine and in the form of mist. The movement of the conveyor belt 32 is regulated by the speed of rotation of drive wheels 60 and 62 which are preferably centered about 50 feet apart. The rice on the conveyor screen 32 moves through the gelatinizer 50 in a total period of from 6–20 minutes, the two water spray stages each lasting about 3–10 minutes.

The tank 52 is provided with a drain pipe 64 positioned above the level of the steam coils 54. Preferably the steam coils are surrounded by water to the level of the drain 64 so that the steam from the coils rises through this water as wet steam. However, if desired, and under certain conditions, the steam coils may be operated without surrounding water so that dry steam, rather than wet steam, passes upwardly through the rice during gelatinization. For this purpose, a second drain pipe 65 is provided in the bottom wall of the tank 52 and is controlled by a valve 67. A vapor-catching hood 66 is positioned above the hot and cold water sprays to re-direct condensed steam and moisture from the water sprays downwardly through the rice and conveyor into the tank 52.

In the first stage of gelatinization, rice on the conveyor 32 is continuously subjected to wet steam from below and hot water sprays every 15 seconds from above, for a period of 3–10 minutes. This provides the rice grains with just enough excess water at an appropriate temperature for proper gelatinization. Thus, the grains acquire the gelatinization temperature first at their outer surfaces and gradually at their inner portions, and are provided with a sufficient amount of excess water at an elevated temperature during the period to permit substantial gelatinization.

In the second stage of gelatinization, the rice is also continuously subjected to steam from below for about 3–10 minutes, but the cold water sprays are positioned to contact the rice about every 30 seconds. The cold sprays act to momentarily lower the temperature at the outer surface portions of the rice grains, but during the periods in which the rice moves from under one spray to the next, the wet steam imparts heat so that gelatinization temperature is again acquired not only by the surface portions of the grain but also by the whole grain just before another spraying with cold water occurs. By thus intermittently stopping the gelatinization of the outer portions of the grain during the second stage of gelatinization, overgelatinization on the outer surfaces during the first stage is prevented and more uniform gelatinization throughout the grain is obtained.

The inclined direction of the water sprays and the slight pressure of the spray or mist on the bed of moving rice momentarily disturbs and separates the rice grains affording a more efficient action by both sprays and the steam. This, too, results in more uniform gelatinization, and this occurs under both the sprays. In addition, this slight agitation separates the grains or kernels, one from another, and helps to prevent their adherence to each other while in a gelatinized state.

At the completion of the second stage of gelatinization, the rice is cooled by blasts of cold air issuing through nozzles 68 positioned above the conveyor 32. The rice is cooled sufficiently to lower its temperature to 20 to 40° C. and to lower the moisture content of the rice from the 50–65% obtained during gelatinization to about 40–55%. The cold air also removes excess liquid from the rice into the drain tank 70. After this partial cooling of the rice, additional enrichment materials in solution or powder form may be sprayed upon the rice from the nozzle 72 if such is desired, or if, for some convenient reason, it has not been added in the hydrator 20.

Alternatively, the rice grains may be cooled at the completion of the second stage of gelatinization with water at a temperature 10 to 55° C. The cooled rice grains may then be drained and/or cold air may be blown through the bed of rice particles to remove excess liquid. The cooled rice grains may then be dried with hot air at a temperature of 80–140° C. to a final moisture content in the range of 10–14%.

Referring to FIGURE 3, the finished rice kernels 76 have the appearance to the naked eye of normal rice or other quick-cooking rice products. However, when examined under a microscope, it will be seen to contain a large number of minute cracks or fissures disposed in both horizontal and vertical directions, and irregularly spaced. The cause of these cracks or fissures is not definitely known but, as shown in FIGURE 4, the cracks extend from the surface inwardly toward the heart or core of the kernel.

The kernels or grains are firm and hard, and retain their shape and form until placed in boiling water. The cracks or fissures in the kernels facilitate rapid moisture penetration and rehydration so that preparation for table use is very quick.

Another embodiment of the invention will now be described. Referring to FIGURE 5, hydrated rice which has been fissured as described above (moisture content 25 to 40%) is fed into a distributor hopper 77 by which the rice is evenly distributed on a reticulated belt 32. The thickness of the layer of rice may be 12 mm. to 24 mm. (one-half to one inch). Belt 32 is moved by drive wheels 60 and 62 and enters a gelatinizing chamber 78 which may be, for example, approximately 12 meters (40 feet) long, 50 cm. (20 in.) high, and 1 meter (39 in.) wide. The chamber is fitted with a dust tight cover shown in cross-sectional view in FIGURE 6. The bottom of the chamber is compartmentalized to hold water at several different levels and constructed in such a way that one level will overflow to the next and the last to the sewer or solids recovery system. Means (not shown), for example, steam coils, are provided to heat the water in the chamber to any desired temperature up to boiling. Also means, not shown, are provided to move the reticulated belt into and out of each compartment at a given rate of speed, allowing a predetermined immersion time and steaming period.

The hydrated rice on belt 32 is immersed in the first compartment containing water at a temperature above 55° C., preferably boiling water, where it is held for about 15 to 25 seconds. Then the belt is moved upwardly and out of the water into a steam atmosphere, remaining for about 50 to 90 seconds. This action is repeated four more times in compartments B and C. The total time for the gelatinization is about 5 to 12 minutes. The intermittent immersion and draining provides the rice grains with sufficient water to gelatinize them and also to gelatinize the inner portions without overgelatinizing the outer portions.

The gelatinized rice is now sprayed at 79 with water having a temperature of 20 to 80° C. to remove loose starch. The moisture content of the rice at this stage is 45–65%. As belt 32 leaves the gelatinizer 78, a stream of air (temperature up to 60° C.) at 80, is blown underneath and through the bed of rice to loosen up the grains and stop gelatinization. The moisture content of the rice grains is now about 40–60%. The rice grains are now transferred to a conventional drying system shown in FIGURE 7. The empty returning belt is subjected to an air blast at 81 to remove adhering particles, then washed at two stages at 82 and returned to the head end of gelatinizer 78.

The gelatinized rice now enters a drier 83 shown in FIGURE 7. This drier may be a travelling belt drier, as shown diagrammatically, wherein drying air flows either countercurrently or cocurrently over or through the reticulated belt conveying the rice. The rice is dried to a moisture content of 15 to 25 percent to permit further conveying of the rice grains without adhering to each other. Next the rice is transferred to a classifier 84 wherein the fine material is removed first.

The fine material may be used as a pregelatinized food product. The whole rice grains from the classifier 84 are transferred to a proportioning feeder 85 from which they enter a tumbler mixer 86. Flavoring and coloring materials and nutritional additives are prepared either in tank 87 or in tank 88. These materials are metered in metering pump 89 which is regulated by feeder 85 to obtain the desired amount of each to be added to the rice. From the metering pump, the said materials are sprayed in stages upon the rice in tumbler 86, thereby providing a uniform coating or adsorption of the materials on or into the rice, as will be described hereinafter. The rice now enters another drying system similar to 83 described above where it is dried to a moisture content of 10 to 14 percent. The agglomerated material or lumps leaving classifier 84 are transferred to a hopper 90, then through a disc separator 91 from which they are returned to a classifier 84.

The finished rice kernels have the same desirable properties heretofore described.

Referring to the addition of flavoring, coloring and enriching materials these, if not already in solution, are dissolved or dispersed in aqueous medium. For example, tomato powder or paste is dissolved in water to a solids content of 14 to 15 percent. To this is added, as desired, flavoring materials (onion, garlic, etc.), additional coloring materials (carotene), vitamins, minerals. It may be desirable, also, to add a protein supplement, for example, a vegetable protein, such as soya protein. The proteins may be in whole or hydrolyzed form. The resultant liquid mixture containing the above-mentioned materials is then sprayed, in several stages, upon the rice. The moisture content of the rice is preferably 15 to 25 percent for this operation but it may be as low as 10 percent. Between each spraying the rice is allowed a period of time in which to absorb the soluble materials and for the dispersed materials to be imbedded in the surface of the rice grains. The resultant surface coating, upon being dried, sets to a firm coating and does not come off, upon handling for packing and shipping. Moreover, although the coating is easily penetrated by water upon cooking, it remains substantially on the grain.

Although several specific embodiments of the invention have been shown and described, it is obvious that many modifications thereof are possible.

This application is a continuation-in-part of application Serial No. 741,263, filed June 11, 1958, now abandoned.

I claim:

1. A process for preparing a quick-cooking rice product which comprises hydrating rice grains with an aqueous medium below the gelatinization temperature of the rice until the moisture content is increased to between 25 and about 40%, partially gelatinizing the hydrated rice over a period of about 3 to about 10 minutes by intermittently continuing hydration of the rice with water having a temperature above about 55° C. and intermittently maintaining the rice in an atmosphere of steam, continuing gelatinization for an additional period of about 3 to about 10 minutes by intermittently continuing hydration of the partially gelatinized rice with water having a temperature below about 55° C. and intermittently keeping the rice in an atmosphere of steam, whereby overgelatinization of the portion already gelatinized is avoided.

2. A process for preparing quick-cooking rice which comprises hydrating rice grains at a temperature in the range of about 20 to about 55° C. to increase the moisture content to between about 25 and about 40%, partially gelatinizing the hydrated rice over a period of about 3 to about 10 minutes by intermittently immersing the hydrated rice in water having a temperature above about 55° C., and intermittently keeping the rice in at atmosphere of steam, continuing gelatinization for an additional period of about 3 to about 10 minutes by intermittently immersing the partially gelatinized rice grains in water having a temperature between about 10 and about 55° C. and intermittently keeping the rice in an atmosphere of steam, cooling the gelatinized rice grains and drying to a final moisture content of about 10 to about 14%.

3. A process for preparing a quick-cooking rice product which comprises hydrating the rice grains at a temperature in the range of about 20 to about 55° C. to increase the moisture content to between about 25 and to about 40%, partially gelatinizing the hydrated rice over a period of about 3 to about 10 minutes by passing steam upward through a layer thereof and intermittently spraying water at a temperature above about 55° C. on the top of the layer, continuing gelatinization for an additional period of about 3 to about 10 minutes by passing steam upward through the layer of the partially gelatinized rice grains and intermittently spraying water having a temperature between about 10 and about 55° C. on the top of the layer, cooling the gelatinized rice grains and drying to a final moisture content of about 10 to about 14%.

4. The method of producing a quick-cooking rice product which comprises hydrating milled grain rice with water at ambient temperature for a period of approximately 120 minutes to increase its moisture content to about 30%–40%, partially gelatinizing a moving layer of the hydrated rice in a first stage during a period of about 3–10 minutes by passing wet steam upward continuously through said moving layer while directing sprays of hot water intermittently upon said layer from above, in a second stage further gelatinizing asid rice to a total gelatinization of about 85–95% during a period of about 3–10 minutes by passing wet steam upward continuously through said moving layer while directing sprays of cold water intermittently upon said layer from above, cooling the rice to a temperature less than 55° C., and drying the rice to a moisture content of about 10 to about 14%.

5. The method of claim 4 wherein the water sprays are applied in the form of a fine mist.

6. The method of claim 4 wherein the gelatinized rice is first dried for approximately five minutes at a temperature of approximately 150° C. to a moisture content of about 25% and finally dried further to a moisture content of about 10 to about 14%.

7. The method according to claim 4 wherein said moving rice is subjected to hot water sprays about every 15 seconds during said first stage of gelatinizing and to cold water sprays about every 30 seconds during said second stage of gelatinizing.

8. The method according to claim 4 wherein said hot and cold water sprays are directed downwardly in the direction of movement of the rice at an angle of approximately 45°.

(References on following page)

References Cited in the file of this patent

UNITED STATES PATENTS

| | | |
|---|---|---|
| 2,438,939 | Ozai-Durrani | Apr. 6, 1948 |
| 2,498,573 | Ozai-Durrani | Feb. 21, 1951 |
| 2,592,170 | Muller | Apr. 8, 1952 |
| 2,638,837 | Talmey et al. | May 17, 1953 |
| 2,696,156 | Campbell et al. | Dec. 7, 1954 |
| 2,696,157 | Campbell et al. | Dec. 7, 1954 |
| 2,696,158 | Shuman et al. | Dec. 7, 1954 |
| 2,740,719 | Ozai-Durrani | Apr. 3, 1956 |
| 2,828,209 | Hollis et al. | Mar. 25, 1958 |
| 2,838,401 | Gates | June 10, 1958 |
| 2,890,957 | Seltzer | June 16, 1959 |
| 2,937,946 | Ozai-Durrani | May 24, 1960 |
| 3,083,102 | Carcassonne-Leduc | Mar. 26, 1963 |

FOREIGN PATENTS

| | | |
|---|---|---|
| 1,130,283 | France | Feb. 4, 1957 |